(12) United States Patent
Kim et al.

(10) Patent No.: US 11,212,667 B2
(45) Date of Patent: Dec. 28, 2021

(54) METHOD FOR TRANSFERRING USER EQUIPMENT CAPABILITY AND APPARATUS FOR SUPPORTING SAME

(71) Applicant: LG Electronics Inc., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 16/492,459

(22) PCT Filed: Mar. 9, 2018

(86) PCT No.: PCT/KR2018/002817
§ 371 (c)(1),
(2) Date: Sep. 9, 2019

(87) PCT Pub. No.: WO2018/164528
PCT Pub. Date: Sep. 13, 2018

(65) Prior Publication Data
US 2021/0204112 A1 Jul. 1, 2021

Related U.S. Application Data

(60) Provisional application No. 62/468,949, filed on Mar. 9, 2017.

(51) Int. Cl.
*H04W 8/24* (2009.01)
(52) U.S. Cl.
CPC .................................. *H04W 8/24* (2013.01)
(58) Field of Classification Search
CPC ....................................................... H04W 8/24

USPC ........................................................ 455/425
See application file for complete search history.

(56) References Cited

U.S. PATENT DOCUMENTS

| 7,587,467 | B2 * | 9/2009 | Hesselink | H04L 67/06 |
| | | | | 709/214 |
| 8,620,894 | B2 * | 12/2013 | Doshi | G06F 16/219 |
| | | | | 707/706 |
| 2008/0049653 | A1 | 2/2008 | Demirhan et al. | |
| 2010/0008509 | A1 * | 1/2010 | Matsushita | H04L 63/061 |
| | | | | 380/279 |

(Continued)

FOREIGN PATENT DOCUMENTS

CN 101889458 11/2010
CN 103974234 8/2014
(Continued)

OTHER PUBLICATIONS

Extended European Search Report in European Application No. 18763365.6, dated Oct. 25, 2019, 11 pages.
(Continued)

*Primary Examiner* — Congvan Tran
(74) *Attorney, Agent, or Firm* — Fish & Richardson P.C.

(57) ABSTRACT

Disclosed are a method for transferring a user equipment (UE) capability and an apparatus for supporting the same. The method comprises the steps of: updating a version of the UE capability by the UE; determining, by the UE, whether the UE capability of the updated current version has been stored in a base station; and transmitting, by the UE, a version index indicating the current version to the base station when it is determined that the UE capability of the current version has been stored in the base station.

14 Claims, 13 Drawing Sheets

(56) References Cited

U.S. PATENT DOCUMENTS

| | | | |
|---|---|---|---|
| 2010/0274765 A1* | 10/2010 | Murphy | G06F 11/3034 |
| | | | 707/652 |
| 2010/0330959 A1 | 12/2010 | Mildh et al. | |
| 2012/0184281 A1 | 7/2012 | Kim et al. | |
| 2014/0056246 A1 | 2/2014 | Chun et al. | |
| 2015/0154063 A1* | 6/2015 | Huang | G06F 11/0787 |
| | | | 714/57 |
| 2015/0312787 A1 | 10/2015 | Das et al. | |
| 2016/0098424 A1* | 4/2016 | Dakshinamurthy | |
| | | | G06F 16/1805 |
| | | | 707/609 |
| 2016/0157228 A1 | 6/2016 | Yum et al. | |
| 2016/0275131 A1* | 9/2016 | Lublinsky | G01C 21/3667 |
| 2017/0019851 A1 | 1/2017 | Mackenzie et al. | |

FOREIGN PATENT DOCUMENTS

| | | |
|---|---|---|
| CN | 104717707 | 6/2015 |
| EP | 3125443 | 2/2017 |
| KR | 20100086497 | 7/2010 |
| KR | 20120131202 | 12/2012 |

OTHER PUBLICATIONS

European Search Report in European Appln. No. 18763365.6, dated May 3, 2021, 8 pages.
CN Office Action in Chinese Appln. No. 201880016957.1, dated Aug. 31, 2021, 16 pages (with English translation).

\* cited by examiner

METHOD FOR TRANSFERRING USER EQUIPMENT CAPABILITY AND APPARATUS FOR SUPPORTING SAME

CROSS-REFERENCE TO RELATED APPLICATIONS

This application is a National Stage application under 35 U.S.C. § 371 of International Application No. PCT/KR2018/002817, filed on Mar. 9, 2018, which claims the benefit of U.S. Provisional Application No. 62/468,949, filed on Mar. 9, 2017. The disclosures of the prior applications are incorporated by reference in their entirety.

BACKGROUND OF THE INVENTION

Field of the Invention

The present invention relates to a technique for efficiently reporting user equipment capability (UE capability).

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve a high data rate, it is considered to implement a super high frequency (millimeter wave (mm-Wave)) band, e.g., 60 GHz band, in the 5G communication system. To decrease a propagation loss of a radio wave and increase a transmission distance in the super high frequency band, beamforming, massive multiple-input multiple-output (MIMO), Full Dimensional MIMO (FD-MIMO), array antenna, analog beamforming, and large scale antenna techniques are discussed in the 5G communication system.

On the other hand, when the connection between the base station and the UE is established, the base station establishes a radio resource for the UE by requesting information on the UE capability from the UE. Thereafter, in order for the network to manage the UE (for example, support of UE mobility), the UE capability is continuously required.

SUMMARY OF THE INVENTION

As the UE transmits updated UE capability or periodically limits the UE capability, when the UE frequently reports this change to the network, a signaling overhead may occur on a Uu interface between the UE and the base station (for example, gNB).

In an aspect, a method for transferring UE capability in a wireless communication system includes: updating, by the UE, a version of the UE capability; determining, by the UE, whether the UE capability of the updated current version is stored in a base station; and transmitting, by the UE, a version index indicating the current version to the base station when it is determined that the UE capability of the current version is stored in the base station.

The method may further include: prior to performing the updating, setting, by the UE, a plurality of versions of the UE capability and version indexes indicating each version; and transmitting, by the UE, at least one UE capability among the plurality of set versions and a version index indicating a version of the at least one UE capability to a base station.

In the determining, it may be determined whether the UE capability of the updated current version is stored in a base station based on whether the terminal transmits the current version and the version index indicating the current version to the base station prior to performing the updating.

The method may further include: inquiring whether the base station has the UE capability of the current version to a core network when it is determined that the UE capability of the current version is not stored in the base station.

The method may further include: requesting, by the base station, a transmission of the UE capability of the current version to the UE when the base station receives, from the core network, a response indicating that the base station does not have the UE capability of the current version.

The method may further include: receiving, by the base station, the UE capability of the current version from the core network, and transmitting, to the UE, a response indicating that the base station has the UE capability of the current version, when the base station receives a response indicating that the base station has the UE capability of the current version from the core network.

The method may further include: transmitting, to the terminal, the response indicating that the base station has the UE capability of the current version, when the base station has the UE capability of the current version.

The version of the UE capability may be set based on at least one of a state of charge of a battery of the UE and a degree of overheating of the UE.

The method may further include: considering the UE capability corresponding to the version index indicated by the indicator as the current version when the base station receives a plurality of version indexes and an indicator indicating any one of the plurality of version indexes from the UE.

The method may further include: considering UE capability corresponding to a first received version index among the plurality of version indexes as the current version, when the base station receives the plurality of version indexes from the UE but does not receive the indicator indicating any one of the plurality of version indexes.

In another aspect, a terminal for reporting UE capability in a wireless communication system includes: a memory; a transceiver; and a processor connecting between the memory and the transceiver, in which the processor may be configured to update, by the UE, a version of the UE capability; determine, by the UE, whether the UE capability of the updated current version is stored in a base station; and transmit, by the UE, a version index indicating the current version to the base station when it is determined that the UE capability of the current version is stored in the base station.

Prior to performing the updating, the processor may be configured to set a plurality of versions of the terminal capability and a version index indicating each version, and transmit, by the UE, at least one UE capability among the plurality of set versions and a version index indicating a version of the at least one UE capability to a base station.

The processor may be configured to determine whether the UE capability of the updated current version is stored in the base station based on whether the UE transmits the current version and the version index indicating the current version to the base station prior to performing the updating.

The processor may be configured to receive, from the base station, a response indicating that the base station has the UE capability of the current version.

The version of the UE capability may be set based on at least one of a state of charge of a battery of the UE and a degree of overheating of the UE.

According to embodiments of the present invention, even if the UE capability is updated, the UE may reduce the signaling overhead between the UE and the base station by transmitting the version indicator indicating the version of the UE capability, not the UE capability itself.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A and 5G. However, technical features of the present invention are not limited thereto.

Figure 1:
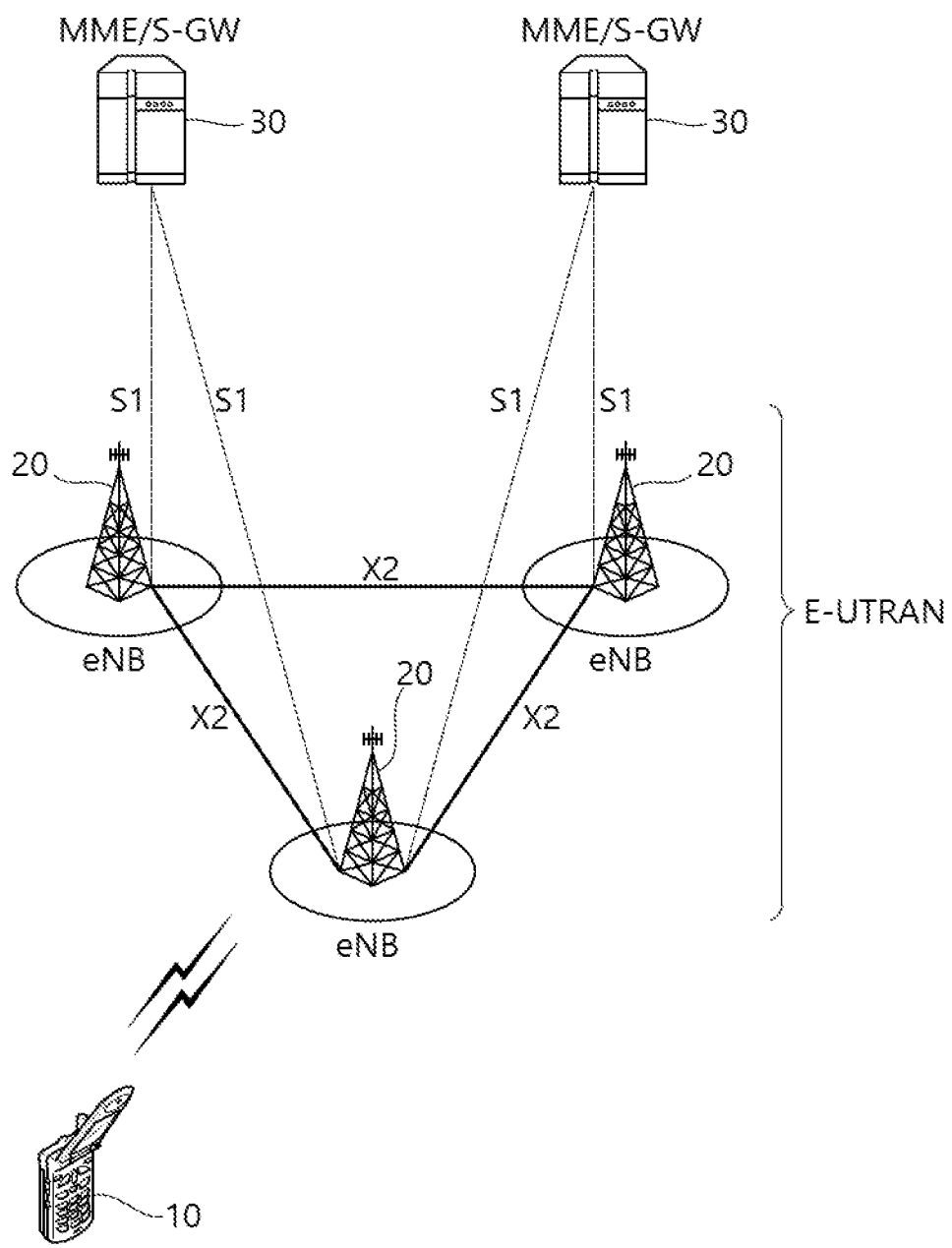
FIG. 1 is a diagram illustrating a structure of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
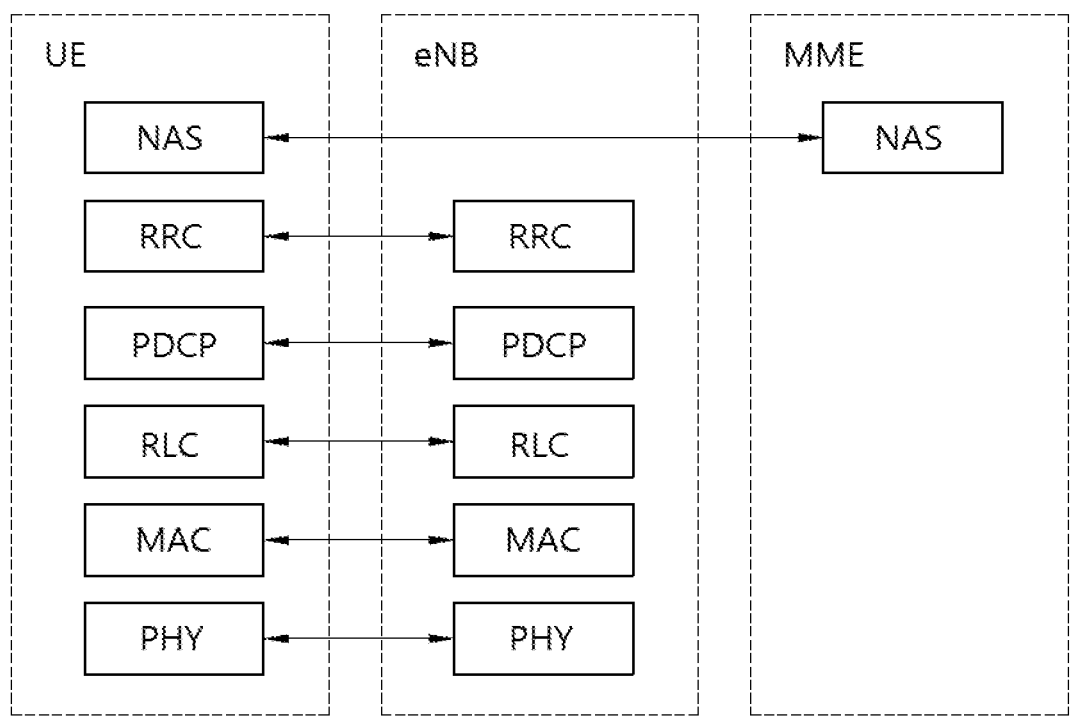
FIG. 2 is a diagram illustrating an air interface protocol of the LTE system for a control plane.
Figure 3:
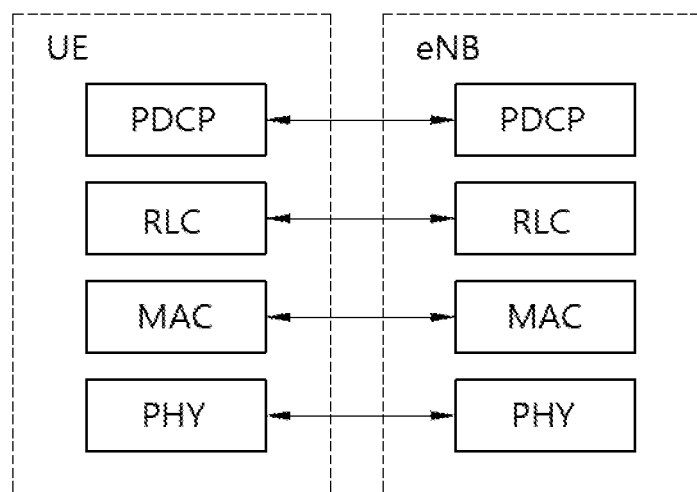
FIG. 3 is a diagram illustrating an air interface protocol of the LTE system for a user plane.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

In order to manage the mobility of the terminal in the NAS layer positioned on the control planes of the terminal and the MME, an EPS mobility management (EMM) registered state and an EMM deregistered state may be defined. The EMM registered state and the EMM deregistered state may be applied to the terminal and the MME. Like a case of turning on the power of the terminal for the first time, an initial terminal is in the EMM deregistered state and the terminal performs a process of registering the terminal in the corresponding network through an initial attach procedure in order to access the network. When the attach procedure is successfully performed, the terminal and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Hereinafter, a 5G network structure is described.

Figure 4:
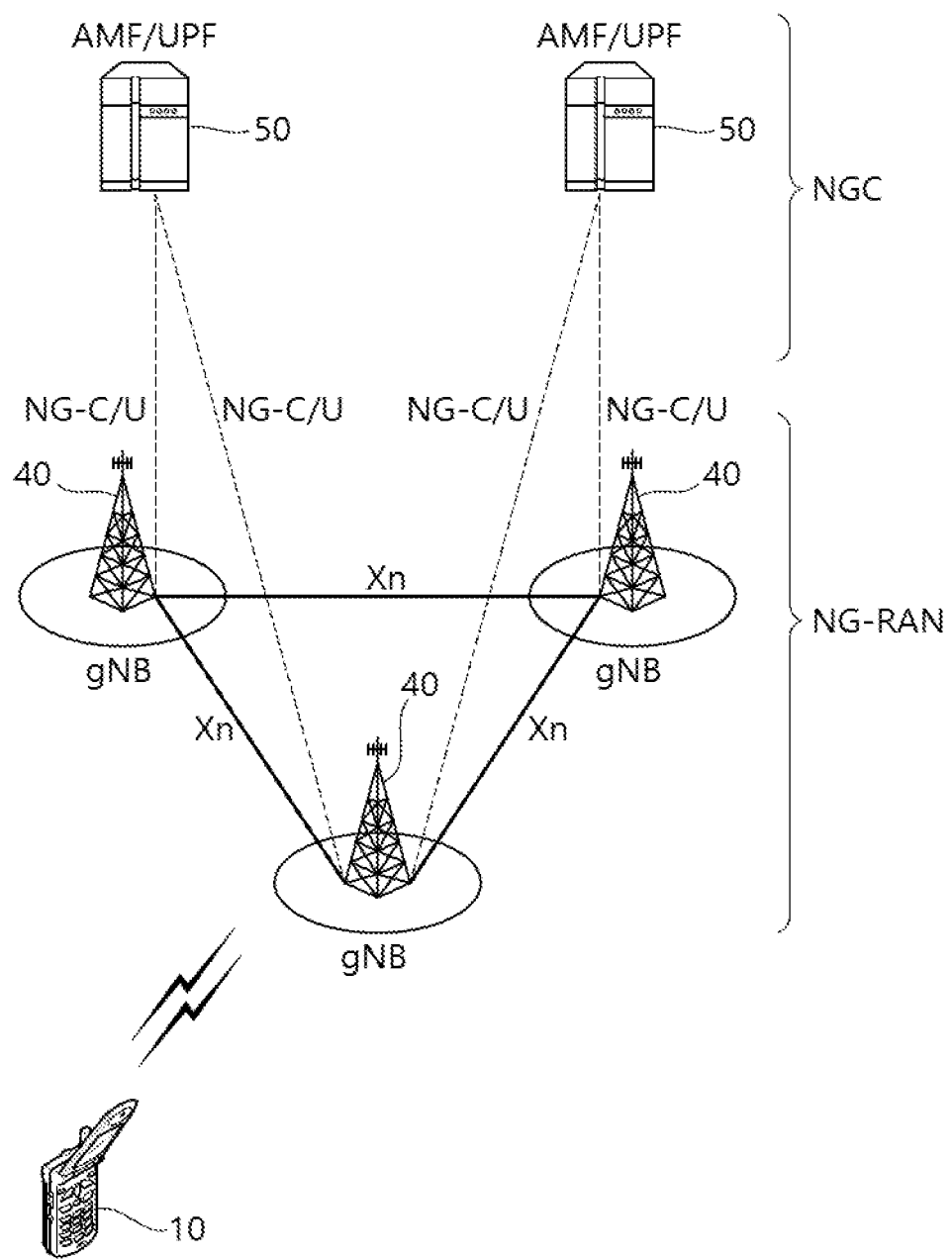
FIG. 4 is a diagram illustrating a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode or lightweight connection mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and am NGC or an S1 interface between an eNB and an EPC may be maintained. In the RRC_INACTIVE state, a core network recognizes that the UE is normally connected to a BS. The RRC_INACTIVE state and a lightly connected mode may be considered as practically identical.

Meanwhile, in the E-UTRAN, the UE in the RRC_CONNECTED state does not support the UE-based cell reselection procedure. However, the UE in the RRC_INACTIVE state can perform the cell reselection procedure, and in this case, the UE should inform the E-UTRAN of the location information of the UE.

Hereinafter, the UE capability will be described. The UE capability is used to control the UE at the network side, and may include information for managing/operating a radio resource of the UE. For example, the UE capability may include UE category, power management related information, code resource information, encryption related information, PDCP parameter, and the like.

Figure 5:
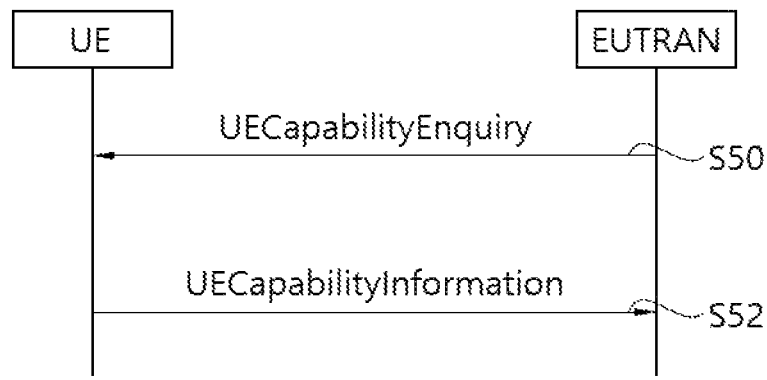
FIG. 5 is a diagram illustrating a procedure of transferring UE capability.

FIG. 5 is a diagram illustrating a procedure of transferring UE capability. The goal of this procedure is to transfer UE radio access capability information from the UE to the E-UTRAN.

When the UE changes the E-UTRAN radio access capability, the UE may update the UE radio access capability by requesting a higher layer to start the required NAS procedure using a new RRC connection.

The change of the UE's GERAN UE radio capability in the RRC_IDLE is supported by the use of the tracking area update.

In step S50, the E-UTRAN initiates a procedure for the UE of the RRC_CONNECTED when (additional) UE radio access capability information is required. The E-UTRAN may request the transmission of the UE capability by transmitting a UECapabilityEnquiry message to the UE. In step S52, the UE may transmit a UECapabilityInformation message in response to the request of the E-UTRAN.

The UECapabilityEnquiry message is used to request the transmission of the UE radio access capability for other UTRAs and other RATs. In addition, the UECapabilityInformation message is used to convey the UE radio access capability requested by the E-UTRAN.

Figure 6:
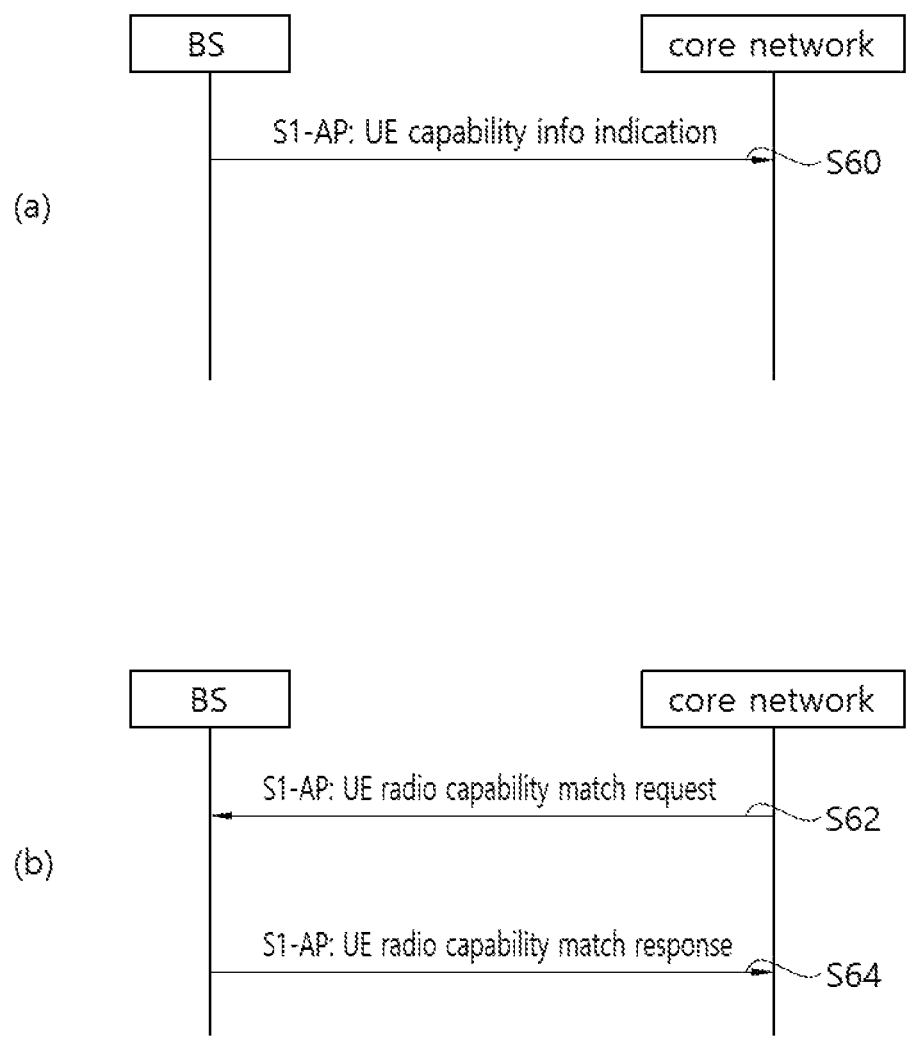
FIG. 6 is diagram illustrating a UE capability information indication procedure.

FIG. 6 is a diagram illustrating a UE capability information indication procedure.

Referring to FIG. 6A, in step S60, the eNB may transmit a UE capability info indication to the MME in order for the eNB to provide the UE capability related information to the MME.

Referring to FIG. 6B, in step S62, the MME may transmit a UE radio capability match request message to the eNB. In step S64, the eNB may transmit the UE radio capability match response message to the MME. The UE capability match procedure is initiated by the MME to request an indicator indicating whether UE radio capabilities match a network configuration for voice continuity.

Meanwhile, as the UE transfers updated UE capability or periodically limits the UE capability, when the UE frequently reports this change to the network, the signaling overhead may occur on the Uu interface between the UE and the base station (for example, gNB). Therefore, there is a need for a method for a UE to efficiently provide information on UE capability to a network side.

Hereinafter, a method for transferring UE capability according to the embodiment of the present disclosure will be described.

1> If the UE capability procedure is triggered,

2> If the UE determines that the current version of the UE capability is already stored in the network (that is, gNB or core network (that is, MME or AMF)), 3> The UE transmits a version index corresponding to the current version of the UE capability to the network.

2> Otherwise (if the UE determines that the current version of the UE capability is not stored in the network), 3> The UE transmits both the current version of the UE capability and the version index corresponding to the current version of the UE capability to the network.

The UE may determine that the network is already stored the current version of the UE capability in the following cases.

1) When the current version of the UE capability is transmitted to the network after the last attach procedure, and/or 2) When the current version of the UE capability is transmitted to the network after the last RRC connection setup procedure, and/or 3) When the validity timer corresponding to the current version is operating.

Otherwise, the UE may determine that the network does not have a current version of the UE capability.

The UE capability can be changed in the following manner.

Option 1: The UE capability can be changed dynamically. That is, the option 1 may be a case where the UE capability of the actual UE is changed.

Option 2: In option 2, the actual UE capability does not change. However, the UE may limit the UE capability according to internal conditions, and may inform the network of the limited UE capability. That is, the UE may limit some of the UE capabilities and set the limited UE capabilities as available UE capabilities. For example, if the state of charge of the battery is very low or the UE is overheated, the UE may need to use limited UE capabilities to minimize power consumption or reduce internal heat. However, different UE capabilities may be applied according to the internal conditions of the UE. Therefore, the UE can set a plurality of UE capabilities. For example, the UE may set three UE capability versions and select any one of them. Meanwhile, the above-described options 1 and 2 show an exemplary form of controlling the UE capability, and the method for controlling UE capability according to the embodiment of the present invention is not necessarily limited to the option 1 or the option 2.

A plurality of versions of the UE capability will be described. According to the embodiment, the version of the UE capability may be determined according to the internal state of the UE. For example, version 1 may be a version using all the UE capabilities. That is, in version 1, the UE may use all the capabilities that the UE can provide. The version 1 can be applied as usual. Version 2 may be a version that uses somewhat limited UE capabilities and may be used when the UE is somewhat overheated. Version 3 may be a version that uses more limited UE capability and may be used when the UE is extremely overheated.

When the UE changes the version of the UE capability, the UE may initiate the UE capability procedure. The UE may be requested for the current version of the UE capability as well as the version index. In this case, even if the UE determines that the network has already stored the current version of the UE capability, the UE may transmit both the current version of the UE capability and the version index indicating the current version to the network. Meanwhile, the version index is identification information indicating each version, and the UE and the network may identify the version of the UE capability based on the version index.

Even if the UE determines that the updated version of the UE capability is not stored in the network, the UE may transmit only the corresponding version index without transmitting the updated version of the UE capability. In this case, the network may determine whether it has the updated version of the UE capability corresponding to the received version index. If the UE does not have the updated version of the UE capability, the network may request the transmission of the updated version of the UE capability to the UE. In response to the request received from the network, the UE may transmit the updated version of the UE capability.

Meanwhile, the UE may simultaneously transmit a plurality of versions to the network. In this case, the following information may be transmitted to the network together.
Versions of the plurality of UE capabilities and version indexes for each version
A current version indicator indicating which version of the plurality of versions is currently used (if there is no indicator indicating the current version, the first version of the provided UE capabilities may be considered as the current version).

Hereinafter, a method for transferring UE capability according to embodiments of the present invention will be described with reference to FIGS. 7 to 11. Next, the procedures shown in FIGS. 7 to 10 may be performed. In the present description, the base station may be a gNB or an eNB, the core network may be an AMF or an MME, and the network may collectively refer to the base station and the core network. In addition, in the present description, the UE capability is used to control the UE at the network side, and may include information for managing/operating the radio resource of the UE. For example, the UE capability may include UE category, power management related information, code resource information, encryption related information, PDCP parameter, and the like.

Figure 7:
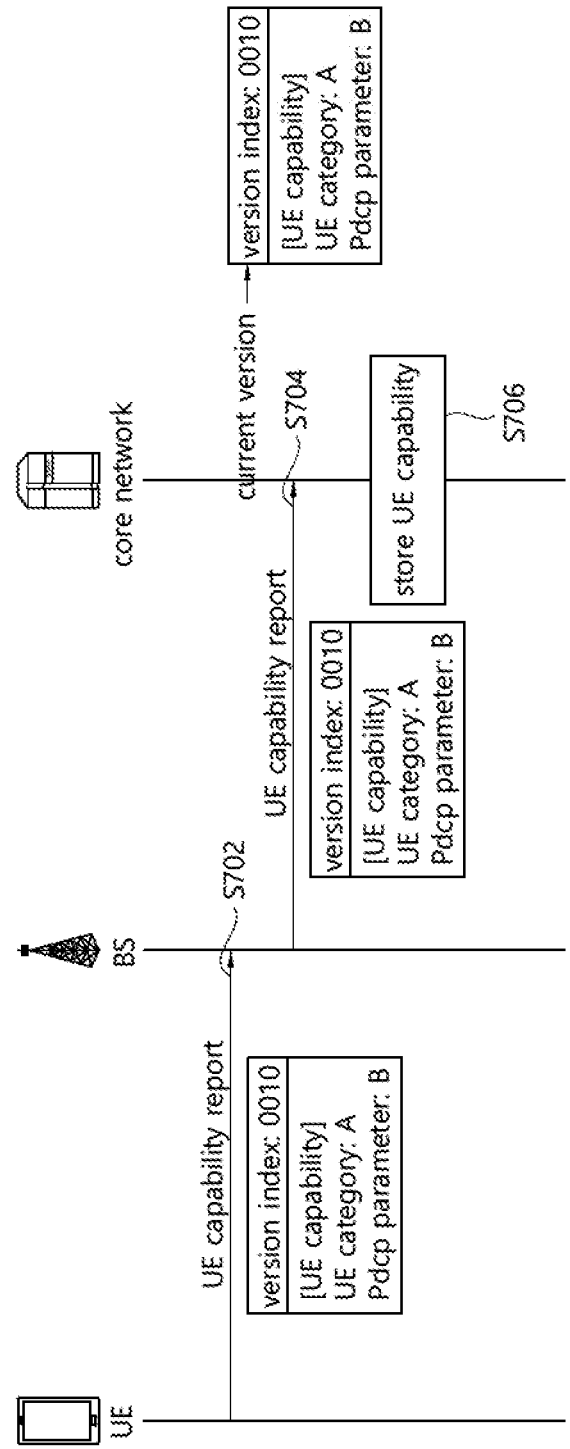
FIGS. 7 to 11 are flowcharts illustrating a method for transferring UE capability according to an embodiment of the present invention.

First, the method for transferring UE capability according to the embodiment of the present disclosure will be described with reference to FIG. 7.

In step S702, the UE may report the UE capability to the base station. According to the embodiment, the UE may determine that a version of the UE capability indicated by version index '0010' is not stored in the network and report the corresponding UE capability as well as the version index.

In step S704, the base station may store the received version index and the corresponding UE capability, and relay the stored version index and UE capability to the core network.

In step S706, the core network may store the version index and the corresponding UE capability received from the base station.

Figure 8:
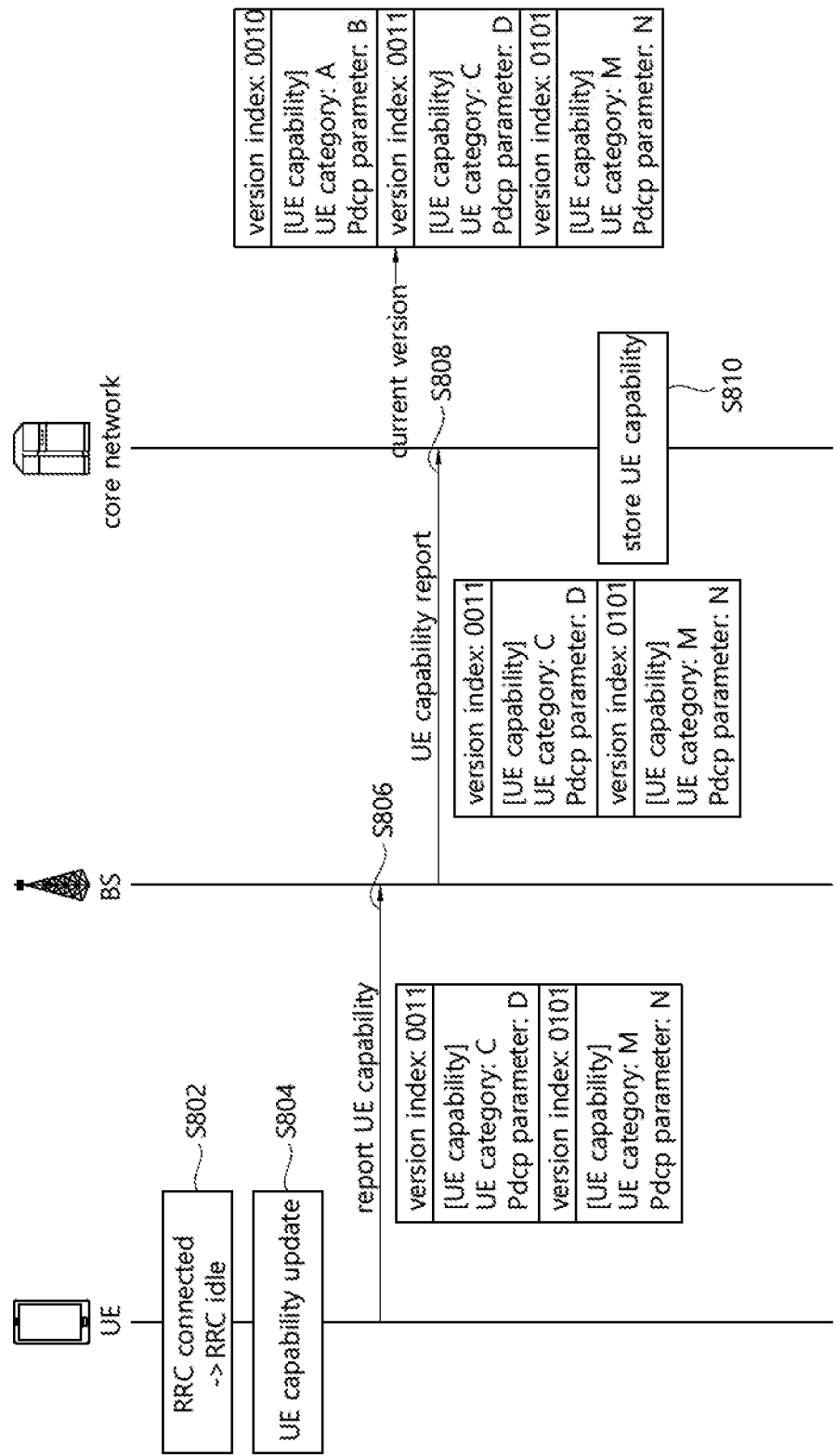

Subsequently, referring to FIG. 8, in step S802, the UE may enter the RRC idle mode. According to an embodiment, when the UE enters the RRC idle state, the base station may delete all the version indexes and the corresponding UE capabilities received from the UE. On the other hand, the core network may still have the version index and the corresponding UE capability received from the UE even if the UE enters the RRC idle state. Meanwhile, the core network may delete the version index and the corresponding UE capability when the UE performs the detach procedure.

In step S804, when the UE enters the RRC connected state again, the UE may select a new version of the UE capability. That is, the UE may update the version of the UE capability after entering the RRC connected state. Thereafter, the UE may change the version again before long. Accordingly, the UE needs to transmit not only the current version of the UE capability, but also other versions of UE capabilities, which can be changed later, to the network at one time.

In step S806, the UE may transfer one or more (for example, two) UE capabilities to the base station. According to an embodiment, the UE may transfer the UE capabilities indicated by version indexes '0011' and '0101' to the base station.

The base station may consider the version of the UE capability indicated by the first version index '0011' among the UE capabilities received from the UE as the current version. Specifically, the UE may transmit a current version indicator indicating the current version of the plurality of (for example, two) versions of the UE capability to the base station, but if the base station does not receive the current version indicator, the first version among the plurality of versions of the UE capability may be considered as the current version.

In step S808, the base station may store two versions of the UE capability along with each version index and relay the stored versions and version indexes to the core network.

In step S810, the core network may store the two versions and each version index of the UE capability. In addition, the core network may similarly consider the UE capability indicated by the version index '0011' as the current version.

Figure 9:
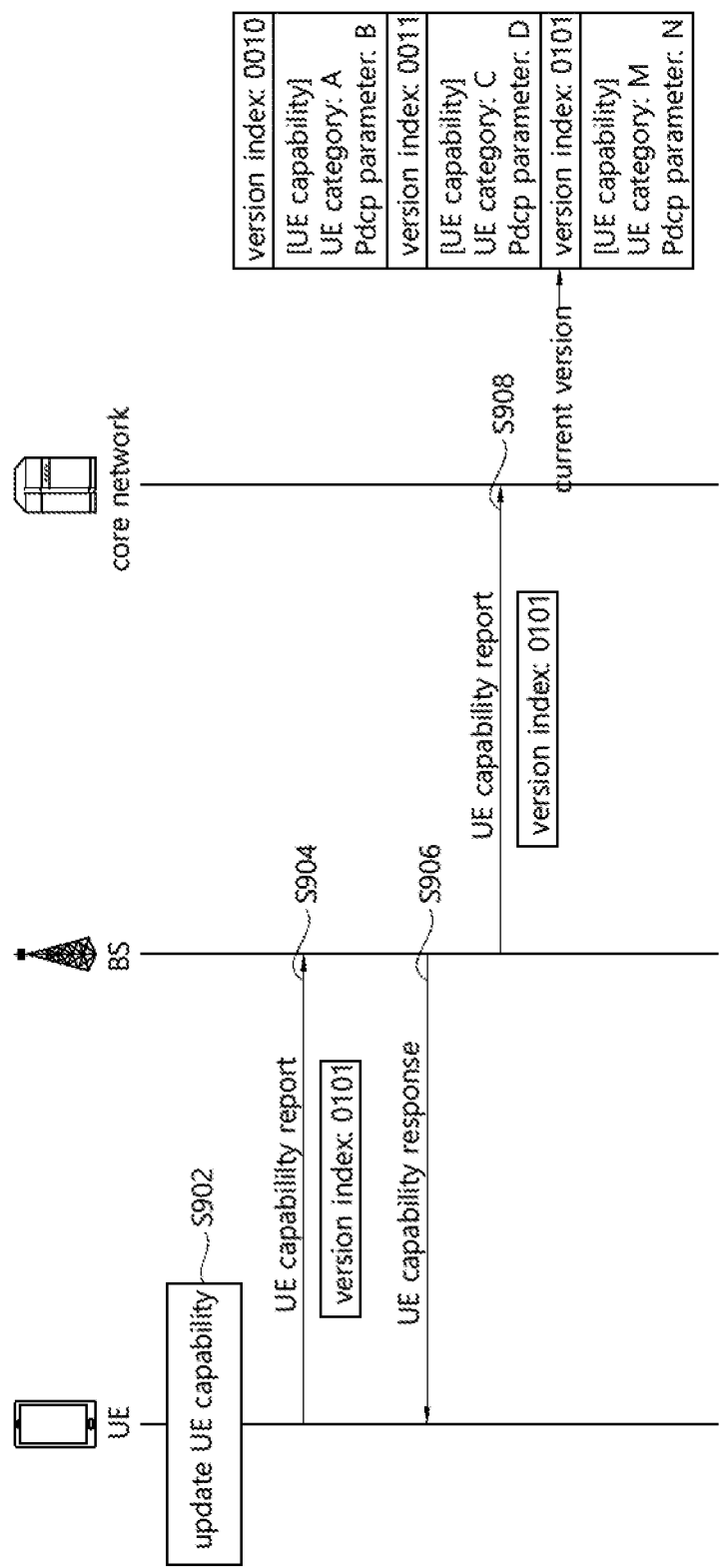

Referring to FIG. 9, in step S902, the UE may update the UE capability.

In step S904, the UE may report the current version of the UE capability to the base station. The UE may determine that the base station already has the UE capability of the version indicated by the version index '0101'. This is because, in step S806, the UE has already transmitted the version index '0101' and the UE capability indicated by the version index to the base station. Accordingly, the UE may transmit only the version index to the base station without transferring the UE capability.

In step S906, the base station may transmit to the UE the UE capability response indicating whether the base station stores the version of the UE capability corresponding to the version index received from the UE. In the present embodiment, the base station may have the version of the UE capability indicated by the version index. Accordingly, the UE capability response may include an indicator indicating that the base station has the version of the corresponding UE capability. After transmitting the UE capability response, the base station may consider the updated UE capability, that is, the UE capability indicated by the version index '0101' as the current version.

In step S908, the base station may transmit the UE capability report to the core network in order to indicate that the current version of the UE capability has changed. The UE capability report indicates a message for the UE to report the UE capability of the UE to the network. After receiving the UE capability report, the core network may know that the UE capability indicated by the version index '0101' is the current version.

Figure 10:
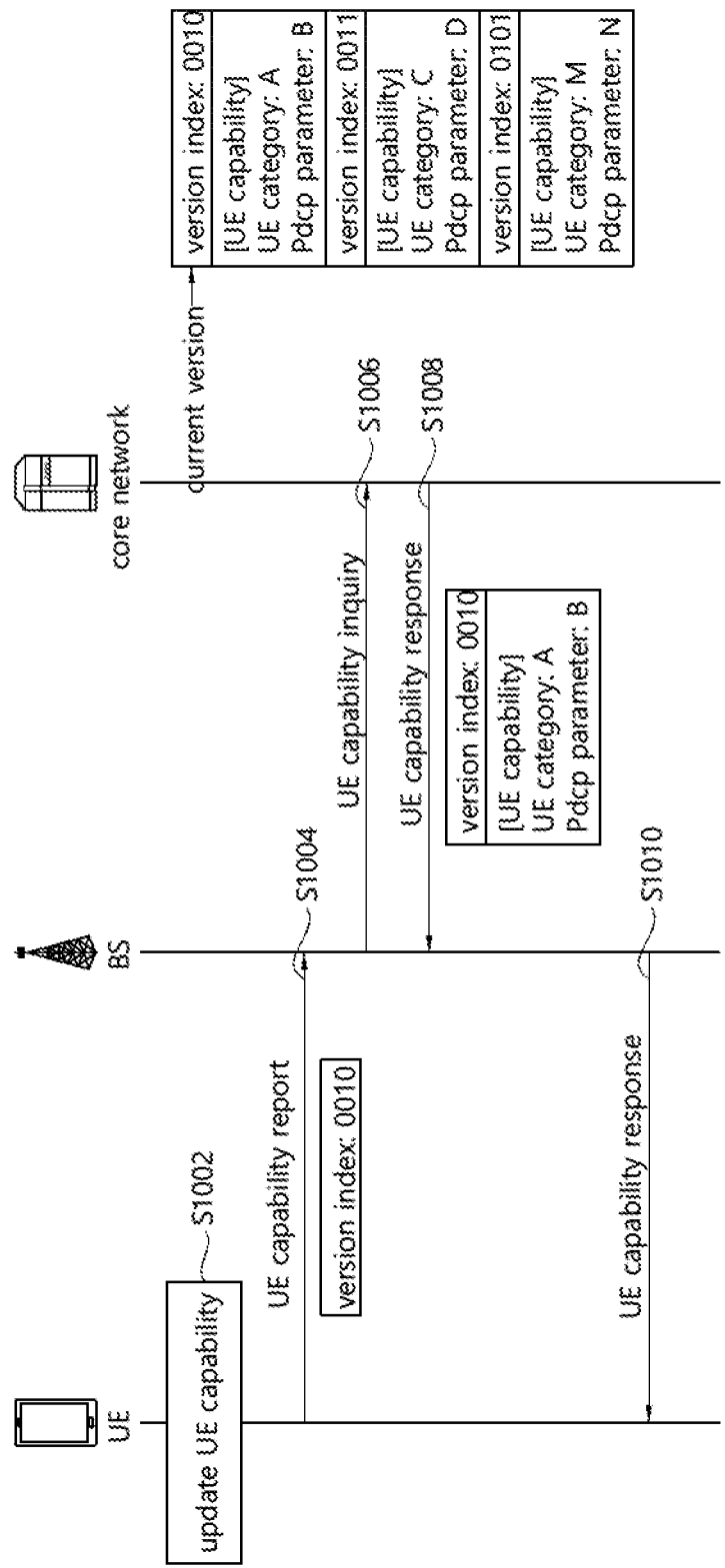

Referring to FIG. 10, in step S1002, the UE may update the UE capability.

In step S1004, the UE may transmit the UE capability report to the base station. The UE determines that the network already has the UE capability indicated by the version index '0010', and may report only the version index '0010' to the base station without transferring the UE capability. This is because, in step S702, the UE has already transmitted the version index '0010' and the UE capability indicated by the version index to the base station.

In step S1006, the base station may transmit a UE capability request corresponding to the version index '0010' to the core network. In detail, after receiving the version index '0010' from the UE, the base station may determine whether the base station has the UE capability corresponding to the version index. In the present embodiment, the base station may not have the UE capability corresponding to the version '0010'. This is because, in step S802, as the UE enters the RRC idle state from the RRC connected state, the base station deletes the UE capability and the version index received from the UE. Therefore, the base station can check whether the core network has the version of the UE capability that the base station does not have.

In step S1008, the core network may transmit the version of the requested UE capability to the base station. That is, when the core network has the version of the UE capability requested from the base station, the core network may transfer the UE capability to the base station Even when the UE enters the RRC idle state in step S802, the core network may store the UE capability received from the UE. The core network may consider the UE capability of the updated version, that is, the UE capability indicated by the version index '0010' as the current version.

In step S1010, the base station may transmit to the UE the UE capability response indicating that the base station has the UE capability indicated by the version index '0010'. After transferring the UE capability response, the base station may consider the UE capability indicated by the version index '0010' as the current version.

Figure 11:
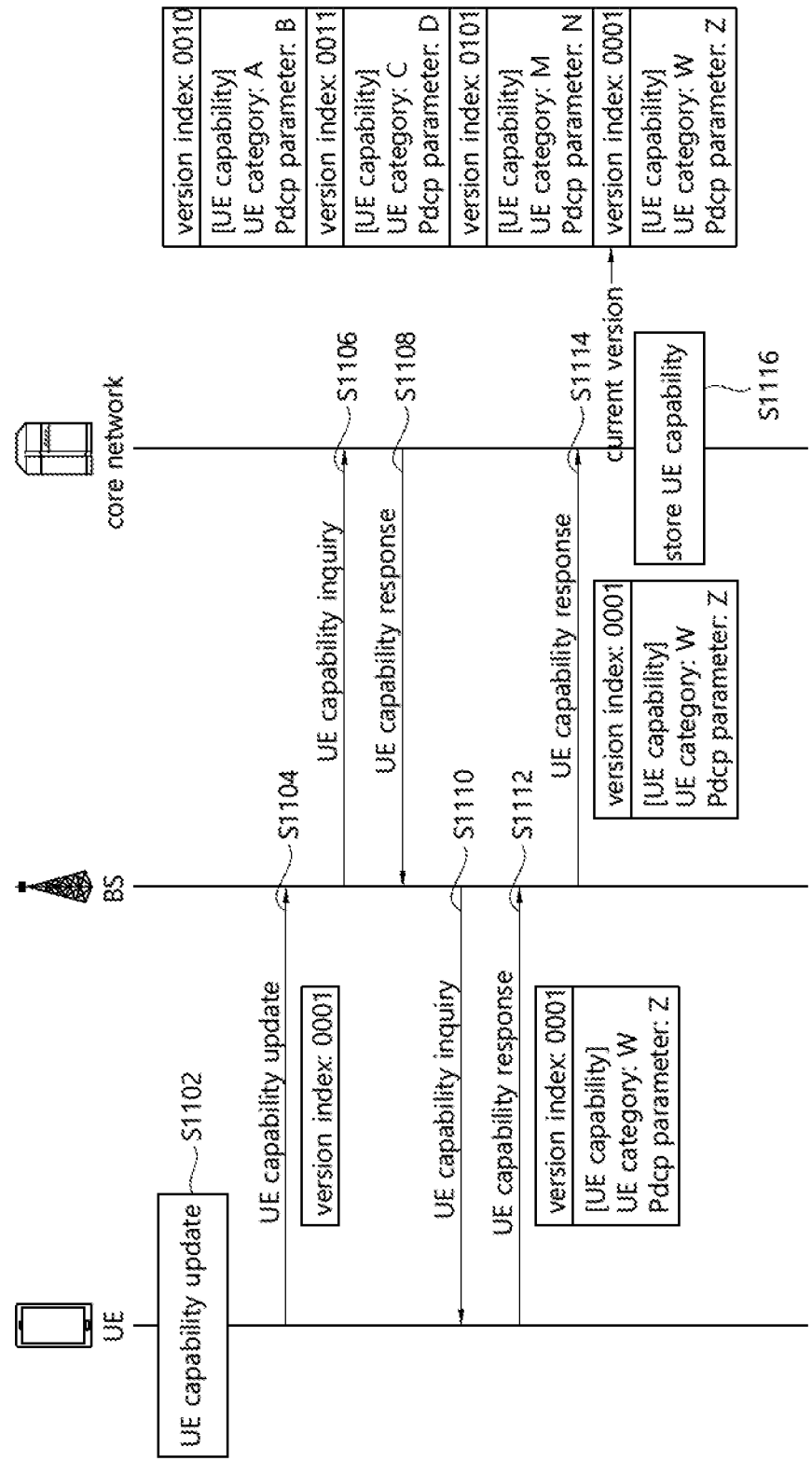

Referring to FIG. 11, in step S1002, the UE may update the UE capability.

In step S1104, the UE may report only the version index without transferring the UE capability. In this step, the version index may indicate '0001'.

In step S1106, after receiving the UE capability report from the UE, the base station may transmit the UE capability request to the core network. Specifically, since the base station does not have the UE capability indicated by the version index '0001' received from the UE, the base station may request the transmission of the UE capability indicated by the version index '0001' to the core network.

In step S1108, it can be checked that the core network does not have the UE capability indicated by the version index '0001'. Accordingly, the core network may inform the base station that the core network does not have the UE capability. That is, if the core network does not have the version of the UE capability requested from the base station, the core network can inform the base station of this fact.

In step S1110, the base station may request the transmission of the UE capability indicated by the version index '0001' to the UE.

In step S1112, the UE may transfer the UE capability indicated by the version index '0001' to the base station.

In step S1112, the base station may transfer the UE capability received from the UE to the base station.

In step S1116, the core network may store the UE capability received from the base station.

Figure 12:
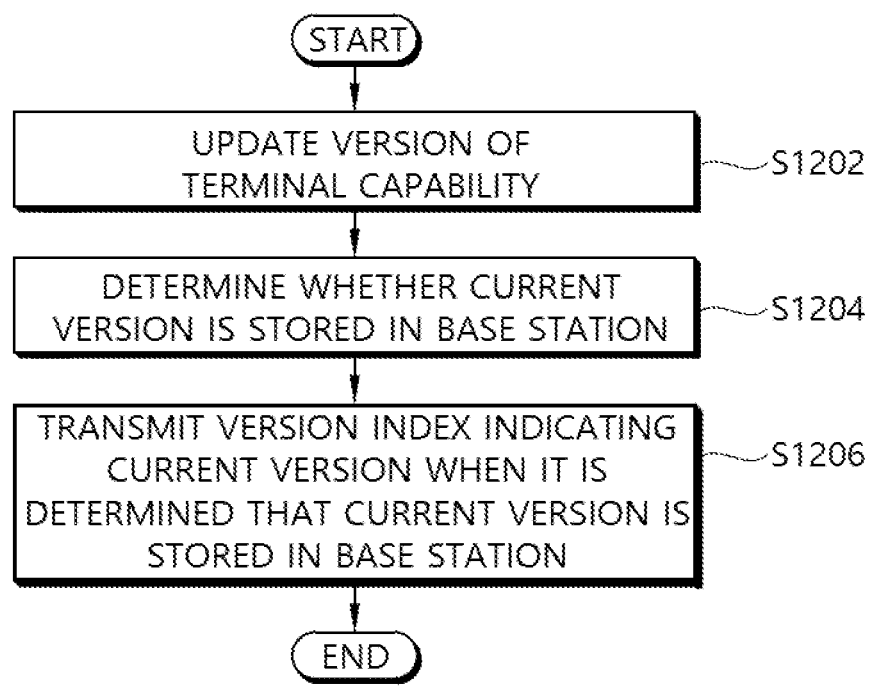
FIG. 12 is a flowchart for describing a method for transferring UE capability according to the embodiment of the present invention.

FIG. 12 is a flowchart for describing a method for transferring UE capability according to the embodiment of the present invention.

In step S1202, the UE may update the version of the UE capability. According to an embodiment, the version of the UE capability may be set based on at least one of the state of charge of the battery of the UE and the degree of overheating of the UE. On the other hand, prior to performing this step, the UE may set a plurality of versions of the UE capability and version indexes indicating each version, and may transfer at least one UE capability of the plurality of set versions and version indexes indicating the version of the at least one UE capability to the base station.

In step S1204, the UE may determine whether the UE capability of the updated current version is stored in the base station. According to an embodiment, it may be determined whether the UE capability of the updated current version is stored in the base station based on whether the UE transmits the current version and the version index indicating the current version to the base station before performing the updating step.

In step S1206, if it is determined that the UE capability of the current version is stored in the base station, the UE may transmit the version index indicating the current version to the base station. When it is determined that the UE capability of the current version is not stored in the base station, the base station may inquire whether the base station has the UE capability of the current version to the core network. When the base station receives, from the core network, a response indicating that the base station does not have the UE capability of the current version, the base station may request the transmission of the UE capability of the current version to the UE. When the base station receives a response indicating that the base network has the current version of the UE capability, the base station may receive the UE capability of the current version from the core network, and the base station may transmit, to the UE, a response indicating that the base station has the UE capability of the current version. When the base station has the UE capability of the current version, the base station may transmit, to the UE, the response indicating that the base station has the UE capability of the current version. In addition, when the base station receives a plurality of version indexes and an indicator indicating any one of the plurality of version indexes from the UE, the base station may consider the UE capability corresponding to the version index indicated by the indicator as the current version. When the base station receives the plurality of version indexes but does not receive the indicator indicating any one of the plurality of version indexes from the UE, the base station may consider UE capability corresponding to a first received version index among the plurality of version indexes as the current version.

Figure 13:
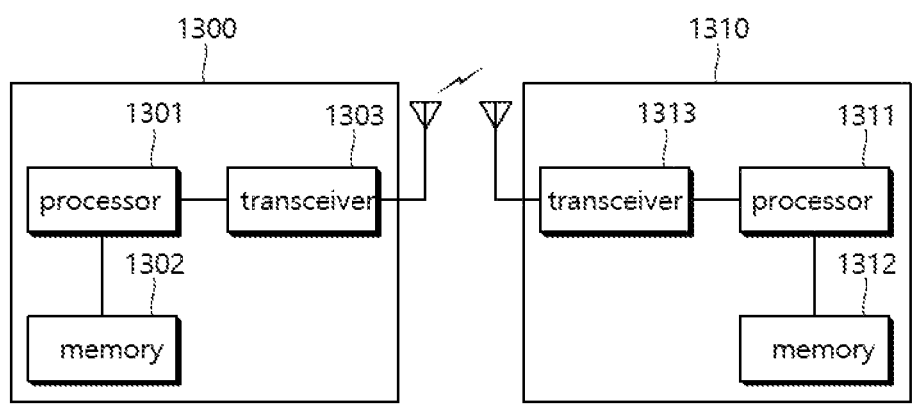
FIG. 13 is a block diagram of a wireless communication system in which an embodiment of the present invention is implemented.

FIG. 13 is a block diagram illustrating a wireless apparatus in which an embodiment of the present invention can be implemented.

ABS 1300 includes a processor 1301, a memory 1302, and a radio frequency (RF) unit 1303. The memory 1302 is coupled to the processor 1301, and stores a variety of information for driving the processor 1301. The RF unit 1303 is coupled to the processor 1301, and transmits and/or receives a radio signal. The processor 1301 implements the proposed functions, procedures, and/or methods. In the aforementioned embodiments, an operation of the BS may be implemented by the processor 1301.

A UE 1310 includes a processor 1311, a memory 1312, and an RF unit 1313. The memory 1312 is coupled to the processor 1311, and stores a variety of information for driving the processor 1311. The RF unit 1313 is coupled to the processor 1311, and transmits and/or receives a radio signal. The processor 61 implements the proposed functions, procedures, and/or methods. In the aforementioned embodiments, an operation of the UE 1310 may be implemented by the processor 1311.

The processors 1311 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transferring information regarding User Equipment (UE) capability in a wireless communication system, comprising:
    setting, by a UE, (i) a plurality of versions of the UE capability and (ii) version indexes indicating each version;
    transmitting, by the UE to a base station, (i) at least one UE capability among the plurality of versions of the UE capability and (ii) a version index indicating a version of the at least one UE capability;
    updating a version of the UE capability by the UE, after transmitting the at least one UE capability and the version index;
    determining, by the UE, whether the UE capability of the updated current version is stored in a base station; and
    transmitting, by the UE, a version index indicating the current version to the base station based on a determination that the UE capability of the current version is stored in the base station.

2. The method of claim 1, wherein in the determining, it is determined whether the UE capability of the updated current version is stored in a base station based on whether the UE transmits the current version and the version index indicating the current version to the base station prior to performing the updating.

3. The method of claim 1, further comprising:
    inquiring whether the base station has the UE capability of the current version to a core network based on a determination that the UE capability of the current version is not stored in the base station.

4. The method of claim 3, further comprising:
    requesting, by the base station, a transmission of the UE capability of the current version to the UE based on the base station receiving, from the core network, a response indicating that the base station does not have the UE capability of the current version.

5. The method of claim 3, further comprising:
    receiving, by the base station, the UE capability of the current version from the core network, and transmitting, to the UE, a response indicating that the base station has the UE capability of the current version, based on the base station receiving a response indicating that the base station has the UE capability of the current version from the core network.

6. The method of claim 5, further comprising:
    transmitting, to the UE, the response indicating that the base station has the UE capability of the current version, based on the base station having the UE capability of the current version.

7. The method of claim 1, wherein the current version of the UE capability is set based on at least one of a state of charge of a battery of the UE and a degree of overheating of the UE.

8. The method of claim 1, further comprising:
    considering the UE capability corresponding to the version index indicated by an indicator as the current version, based on the base station receiving a plurality of version indexes and the indicator indicating any one of the plurality of version indexes from the UE.

9. The method of claim 1, further comprising:
    considering UE capability corresponding to a first received version index among a plurality of version indexes as the current version, based on the base station receiving the plurality of version indexes from the UE but not receiving an indicator indicating any one of the plurality of version indexes.

10. A user equipment (UE) configured to report UE capability in a wireless communication system, the UE comprising:
a memory; a transceiver; and a processor connecting between the memory and the transceiver,
wherein the processor is configured to:
set (i) a plurality of versions of the UE capability and (ii) a version index indicating each version;
transmit, by the UE to a base station, (i) at least one UE capability among the plurality of versions of the UE capability and (ii) a version index indicating a version of the at least one UE capability;
update, by the UE, a version of the UE capability, after transmitting the at least one UE capability and the version index;
determine, by the UE, whether the UE capability of the updated current version is stored in a base station; and
transmit, by the UE, a version index indicating the current version to the base station based on a determination that the UE capability of the current version is stored in the base station.

11. The UE of claim 10, wherein the processor is configured to determine whether the UE capability of the updated current version is stored in the base station based on whether the UE transmits the current version and the version index indicating the current version to the base station prior to performing the update.

12. The UE of claim 10, wherein the processor is configured to receive, from the base station, a response indicating that the base station has the UE capability of the current version.

13. The UE of claim 10, wherein the current version of the UE capability is set based on at least one of a state of charge of a battery of the UE and a degree of overheating of the UE.

14. The method of claim 1, wherein the UE communicates with at least one of a mobile terminal, a network or autonomous vehicles other than the UE.

\* \* \* \* \*